United States Patent
Higuchi et al.

(10) Patent No.: US 6,780,483 B1
(45) Date of Patent: Aug. 24, 2004

(54) FLUOROPOLYMER LAMINATE

(75) Inventors: Tatsuya Higuchi, Settsu (JP); Hidenori Ozaki, Settsu (JP); Takahiro Kitahara, Settsu (JP); Kazuo Ishiwari, Settsu (JP)

(73) Assignee: Daikin Industries Ltd., Osaka (JP)

( * ) Notice: Subject to any disclaimer, the term of this patent is extended or adjusted under 35 U.S.C. 154(b) by 172 days.

(21) Appl. No.: 10/069,342

(22) PCT Filed: Aug. 24, 2000

(86) PCT No.: PCT/JP00/05673

§ 371 (c)(1),
(2), (4) Date: Feb. 25, 2002

(87) PCT Pub. No.: WO01/14141

PCT Pub. Date: Mar. 1, 2001

(30) Foreign Application Priority Data

Aug. 25, 1999 (JP) ............................................ 11/238227

(51) Int. Cl.[7] ............................ B32B 27/00; B32B 1/08; B29D 22/00; B29D 23/00
(52) U.S. Cl. ................... 428/36.7; 428/421; 428/36.91; 428/36.9; 525/330.6
(58) Field of Search .............................. 428/36.9, 36.91, 428/36.7, 421, 422; 525/330.6; 526/250, 253, 254, 348.8

(56) References Cited

U.S. PATENT DOCUMENTS

| | | | | |
|---|---|---|---|---|
| 4,497,856 A | * | 2/1985 | Iwasawa et al. | 220/62.11 |
| 4,916,020 A | | 4/1990 | Golding et al. | 428/421 |
| 6,372,870 B1 | * | 4/2002 | Kitahara et al. | 526/250 |

FOREIGN PATENT DOCUMENTS

| | | |
|---|---|---|
| JP | 56-86748 A | 7/1981 |
| JP | 56 86748 | 7/1981 |
| JP | 7 18035 | 1/1995 |
| JP | 7 25952 | 1/1995 |
| JP | 7 25954 | 1/1995 |
| JP | 7 173230 | 7/1995 |
| JP | 7 173446 | 7/1995 |
| JP | 7 173447 | 7/1995 |
| JP | 7 228848 | 8/1995 |
| WO | 98/58973 A | 12/1998 |
| WO | WO98 58973 | 12/1998 |
| WO | WO99 45044 | 9/1999 |
| WO | 99/45044 A | 9/1999 |

* cited by examiner

*Primary Examiner*—Harold Pyon
*Assistant Examiner*—Catherine A. Simone
(74) *Attorney, Agent, or Firm*—Birch, Stewart, Kolasch & Birch, LLP

(57) ABSTRACT

A layer of a tetrafluoroethylene copolymer having 30 to 81% by mole of tetrafluoroethylene and 70 to 19% by mole of at least one other monomer and having a carbonate group in a polymer chain or at a polymer chain terminal, which has a melt flow rate of 0.1 to 100 g/10 minutes (230° C., 5 kg-load) and a melting point of 90 to 230° C. and a layer of a polyolefin resin are adhered with a layer of an ethylene-vinyl acetate copolymer, which satisfies the following relationship: $X \times Y/100 \geq 7.0$, wherein X is a vinyl acetate content (% by mole) and Y is a saponification degree of a methyl ester (%). The resulting laminate has high resistance to fuels, and the layer of the tetrafluoroethylene copolymer having a carbonate group and the layer of the polyolefin resin are firmly adhered.

15 Claims, No Drawings

FLUOROPOLYMER LAMINATE

This application is the national phase under 35 U.S.C. § 371 of PCT International Application No. PCT/JP00/05673 which has an International filing date of Aug. 24, 2000, which designated the United States of America.

FIELD OF THE INVENTION

The present invention relates to a laminate comprising a fluorine-containing polymer. In particular, the present invention relates to a laminate comprising a layer of a tetrafluoroethylene copolymer having a carbonate group and a layer of a polyolefin resin.

BACKGROUND ART

Fluorine-containing polymers are used in various applications since they have excellent heat resistance, chemical resistance, surface properties (e.g. low abrasion properties, etc.) and electrical insulating properties. However, the fluorine-containing polymers have generally insufficient mechanical strength or dimensional stability, or they are expensive.

Thus, various attempts such as the adhesion or lamination of the fluorine-containing polymer to other organic material or an inorganic material have been made to make the best use of advantages of the fluorine-containing polymers while minimizing their disadvantages.

However, the fluorine-containing polymers inherently have a low adhesion force so that it is difficult to adhere them directly to other material. Even if fusion bonding is tried, the adhesion strength is insufficient, or when a certain level of adhesion strength is attained, the adhesion force tends to vary with a kind of a substrate. Thus, the reliability of the adhesion is often insufficient.

To adhere the fluorine-containing polymers to other material, the following methods are mainly discussed:

1. Physically roughening the surface of a substrate with sand bluster treatment, etc.;
2. Surface treatment of a fluorine-containing polymer by sodium etching, plasma treatment, photochemical treatment, etc.;
3. Adhesion with an adhesive.

The methods 1 and 2 require the treatment process and the treatment steps are complicated, and thus their productivity is low. In addition, in the methods 1 and 2, the kinds and shapes of the substrates are limited. Anyhow, the adhesion force achieved by the methods 1 and 2 is low, and the appearance of the resulting laminate tends to have some problems (e.g. coloring, flaws, etc.).

Various adhesives to be used in the method 3 are examined. Conventional hydrocarbon base adhesives have insufficient adhesion properties, and their own heat resistance is insufficient. Therefore, such adhesives cannot generally withstand adhering conditions for the fluorine-containing polymers which require molding or processing at high temperature, and they suffer from delamination or coloration due to decomposition. The laminates using such adhesives cannot maintain the adhesion force due to the change of temperature and environment and lack reliability since their adhesive layers have insufficient heat resistance, chemical resistance or water resistance.

Alternatively, adhesion with an adhesive or an adhesive composition comprising a fluorine-containing polymer having a functional group is studied.

Prior arts disclose, as an adhesive, the use of a fluorine-containing polymer to which a hydrocarbon monomer having a carboxyl group, a carboxylic anhydride group, an epoxy group or a hydrolyzable silyl group (e.g., maleic anhydrice, vinyltrimethoxysilane, etc.) is grafted (e.g., JP-A-7-18035, JP-A-7-25952, JP-A-7-25954, JP-A-7-173230, JP-A-7-173446, JP-A-7-173447, etc.), or the use of a cured material of an adhesive composition containing a fluorine-containing copolymer which comprises a hydrocarbon monomer having a functional group such as hydroxyalkyl vinyl ether copolymerized with tetrafluoroethylene, chlorotrifluoroethylene, etc., and a isocyanate curing agent as an adhesive for adhering polyvinyl chloride to ETFE (ethylene-tetrafluoroethylene copolymer) which has been treated with corona discharge (e.g., JP-A-7-228848).

The adhesive or adhesive composition comprising the fluorine-containing polymer to which the functional hydrocarbon monomer is grafted or copolymerized has insufficient heat resistance. Thus, it decomposes and foams so that the adhesion strength decreases, or the layers are delaminated or colored, when it is processed together with the fluororesin or used at a high temperature. The adhesive composition disclosed in JP-A-7-228848 requires the corona discharge treatment of the fluororesin.

Furthermore, it is reported to use a fluorine-containing polymer having a functional group, which is prepared by copolymerizing a perfluorovinyl ether having a carboxylic acid group or its derivative with a fluorine-containing monomer, as an adhesive or an adhesive composition. US Pat. No. 4,916,020 discloses a laminate using a fluorine-containing polymer having a functional group which is introduced in the polymer by copolymerizing a perfluorovinyl ether having a carboxylic acid group or its derivative with tetrafluoroethylene, etc.

In this laminate, the above-described fluorine-containing polymer having a carboxylic acid group, etc. is laminated on other substrate such as a metal substrate through an adhesive resin such as an epoxy resin, a urethane resin, etc. Thus, the epoxy resin or the urethane resin has problems in its heat resistance, chemical resistance or solvent resistance when the laminate is used.

WO98/58973 (published on Dec. 30, 1998) discloses a laminate comprising a layer of a tetrafluoroethylene copolymer having a terminal carbonate group, a layer of other material such as a thermoplastic resin, and an intermediate layer between them. One example described in this WO publication is a laminate comprising an intermediate layer of an epoxy group-containing polyethylene when polyethylene is used as the other material.

When the layer of the tetrafluoroethylene copolymer having a terminal carbonate group and the polyethylene layer are adhered with the epoxy group-containing polyethylene, the initial adhesion force is high, but the adhesion force tends to decrease with time. In addition, the epoxy group-containing polyethylene itself has low resistance to fuel and is dissolved in the fuel. Thus, this laminate cannot be used to fabricate a tube or a tank for storing the fuel.

DISCLOSURE OF THE INVENTION one object of the present invention is to provide a laminate which comprises a layer of a tetrafluoroethylene copolymer having a carbonate group and a layer of a polyolefine resin strongly adhered to each other, the adhesion strength of which does not decrease with time, and which has high resistance to fuel.

According to the present invention, the above object is achieved by a laminate comprising (1) a layer of a tetrafluoroethylene copolymer comprising 30 to 81% by mole of tetrafluoroethylene and 70 to 19% by mole of at least one other monomer and having a carbonate group in a polymer chain or at a polymer chain terminal, which has a melt flow rate of 0.1 to 100 g/10 minutes (230° C., 5 kg-load) and a melting point of 90 to 230° C., (2) a layer of an ethylene-vinyl acetate copolymer formed on one surface of the layer (1), which satisfies the following relationship:

$$X \times Y/100 \geq 7.0$$

wherein X is a vinyl acetate content (% by mole) and Y is a saponification degree of a methyl ester (%), and (3) a layer of a polyolefin resin formed on the layer (2).

The carbonate group contained in the tetrafluoroethylene copolymer to be used in the present invention is a group having a bond of the formula: —OC(=O)O—, and a specific example of the carbonate group is a group of the formula: —OC(=O)O—R wherein R is a hydrogen atom, an organic group (e.g. a $C_1$–$C_{20}$ alkyl group, a $C_2$–$C_{20}$ alkyl group having an ether linkage, etc.), or an element of the I, II or VII Group. Preferable examples of the carbonate group include —OC(=O)O—$CH_3$, —OC(=O)O—$C_3H_7$, —OC(=O)O—$C_8H_{17}$, —OC(=O)O—$CH_2CH_2OCH_2CH_3$, and the like.

The tetrafluoroethylene copolymer having a carbonate group at a polymer chain terminal means a tetrafluoroethylene polymer having a functional group comprising a carbonate group on at least one terminal of the polymer chain. The tetrafluoroethylene copolymer having a carbonate group in a polymer chain means a copolymer prepared by copolymerizing an ethylenically unsaturated monomer having a carbonate group and tetrafluoroethylene. One polymer chain may have the carbonate groups in the polymer chain and also at the polymer chain terminal.

Among these copolymers, the tetrafluoroethylene copolymer having a carbonate group at a polymer chain terminal is preferable since it does not remarkably deteriorate heat resistance, mechanical properties and chemical resistance, or it is advantageous from the viewpoint of productivity and cost.

A polymer having no carbonate group may be compounded in the tetrafluoroethylene copolymer having a carbonate group.

According to the present invention, it is necessary for the tetrafluoroethylene copolymer to be fusion bonded to the polyolefin layer as an opposite material for lamination at a temperature at which polyolefin is not thermally decomposed, and has a viscosity so that the copolymer can sufficiently flow at such a temperature. A preferred range of the fusion bonding temperature of polyolefin is from about 200 to 280° C. Thus, the tetrafluoroethylene copolymer used in the present invention should be melt and have a melt viscosity so that it can flow in this temperature range.

When it is desired to lower the permeability of a fuel, the tetrafluoroethylene copolymer having a high melting point, that is, a melt flow rate of 0.1 to 100 g/10 minutes (230° C., 5 kg-load) and a melting point of 90 to 230° C. is preferably used. When the other material has low heat resistance, the tetrafluoroethylene copolymer having a low melting point, that is, a melt flow rate of 0.1 to 100g/10 minutes (200° C., 5 kg-load) and a melting point of 90 to 200° C. is preferably used.

In the present invention, the melt flow rate (MER) of the tetrafluoroethylene copolymer is preferably from 1.0 to 100 g/10 minutes, more preferably from 1.0 to 50 g/10 minutes.

Herein, the melt flow rate is measured at 200° C. or 230° C. under a load of 5 kg with an orifice diameter of 2 mm and a land length of 8 mm.

In addition, the tetrafluoroethylene copolymer used in the present invention has a critical shear rate of 10 to $10^3$ sec$^{-1}$ at 230° C., and can be molded at a lower temperature than conventional fluororesins. Because of such a critical shear rate, the tetrafluoroethylene copolymer used in the present invention can solely be molded to form a molded article in the form of a film or a tube and also coextrusion molded with the polyolefin resin.

In one preferred embodiment, the tetrafluoroethylene copolymer used in the present invention has a monomer composition comprising 40 to 81% by mole of tetrafluoroethylene (TFE) and 60 to 19% by mole of other monomer, in particular, 40 to 81% by mole of TFE, 6 to 43% by mole of ethylene (Et) and 0 to 30% by mole of hexafluoropropylene (HFP).

More preferably, the monomer composition comprises 40 to 60% by mole of TFE, 24 to 43% by mole of Et and 5 to 30% by mole of HFP, since a polymerization decreases as the content of TFE increases.

The melting point of the tetrafluoroethylene copolymer used in the present invention continuously decreases and its crystallinity decreases so that its transparency increases, as the content of HFP increases.

In another preferred embodiment, in addition to TFE, Et and HFP, the tetrafluoroethylene copolymer used in the present invention may contain, as a modifier monomer, a fluorovinyl compound of the formula (I):

$$CH_2=CFRf \qquad (I)$$

wherein Rf is a fluoroalkyl group having 2 to 10 carbon atoms.

When the number of carbon atoms of Rf is less than 2, the modification of the tetrafluoroethylene copolymer (for example, the suppression of cracking of molded articles during molding of the copolymer or in use) may be insufficient. When the number of carbon atoms of Rf exceeds 10, the compound (I) may be disadvantageous from the viewpoint of polymerization reactivity. In particular, Rf having 3 to 5 carbon atom is preferable.

From the viewpoint of the heat resistance of the copolymer obtained, the Rf group is most preferably a perfluoroalkyl group, or a ω-hydro- or ω-chloroperfluoroalkyl group.

Among those fluorovinyl compounds, a fluorovinyl compound of the formula (II):

$$CH_2=CF(CF_2)_nH \qquad (II)$$

wherein n is a number of 2 to 10, in particular, a number of 3 to 5 is preferable from the viewpoint of copolymerizability, costs for the preparation of the copolymer, and the properties of the copolymer obtained.

When the fluorovinyl compound (I) is used as a modifier monomer, a monomer composition is such that a molar ratio of tetrafluoroethylene to ethylene is from 40:60 to 90:10, the content of the fluorovinyl compound is from 0 to 10% by mole (based on the whole copolymer) and the content of hexane is from 0 to 30% by mole (based on the whole copolymer).

The tetrafluoroethylene copolymer of the present invention can be prepared by a polymerization process which is used to prepare ETFE.

To introduce the carbonate group at the chain terminal, a peroxycarbonate is used as a polymerization initiator in the preparation of the tetrafluoroethylene copolymer of the present invention. Examples of the peroxycarbonate include the following compounds (1) to (4):

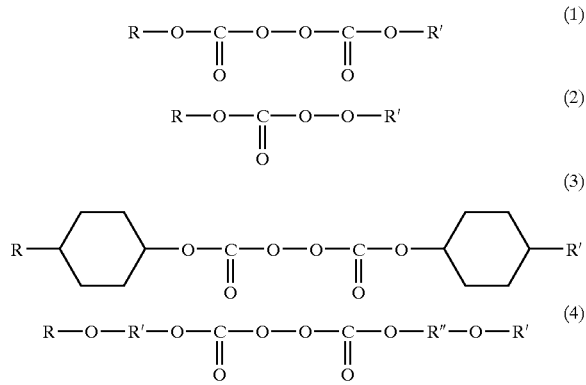

wherein R and R' represent independently of each other a monovalent saturated straight or branched hydrocarbon group having 1 to 15 carbon atoms or a monovalent saturated straight or branched hydrocarbon having 1 to 15 carbon atoms and an alkoxyl group at the end of the molecule, and R" is a divalent saturated straight or branched hydrocarbon group having 1 to 15 carbon atoms or a divalent saturated straight or branched hydrocarbon having 1 to 15 carbon atoms and an alkoxyl group at the end of the molecule.

In particular, diisopropyl peroxydicarbonate, di-n-propyl peroxydicarbonate, tert.-butylperoxyisoprpyl carbonate, bis (4-tert.-butylcyclohexyl) peroxydicarbonate, di-2-ethylhexyl peroxydicarbonate, etc. are preferable.

Industrially, the polymerization is preferably carried out by suspension polymerization in an aqueous medium using a fluorine-containing solvent and a peroxycarbonate as a polymerization initiator, although other polymerization methods such as solution polymerization, bulk polymerization, etc. may be employed.

Examples of the fluorine-containing solvent include hydrochlorofluoroalkanes (e.g. $CH_3CClF_2$, $CH_3CCl_2F$, $CF_3CF_2CCl_2H$, $CF_2ClCF_2CFHCl$, etc.), chlorofluoroalkanes (e.g. $CF_2ClCFClCF_2CF_3$, $CF_3CFClCFClCF_3$, etc.), and perfluoroalkanes (e.g. perfluorocyclobutane, $CF_3CF_2CF_2CF3$, $CF_3CF_2CF_2CF_2CF_3$, $CF_3CF_2CF_2CF_2CF_2CF_3$, etc.). Among them, the perfluoralkanes are preferable.

The amount of the solvent used is preferably from 10 to 100% by weight based on water from the viewpoint of suspending properties and costs.

The polymerization temperature is not limited, and is preferably from 0 to 100° C.

The polymerization pressure may be determined according to other polymerization conditions such as the kind, amount and vapor pressure of the solvent used, the polymerizationtemperature, etc. Usually, the polymerization pressure may be from 0 to 50 kgf/cm$^2$G.

In the preparation of the tetrafluoroethylene copolymer of the present invention, a conventional chain transfer agent, for example, a hydrocarbon such as isopentane, n-pentane, n-hexane, cyclohexane; an alcohol such as methanol, ethanol, etc.; and a halohydrocarbon such as carbon tetrachloride, chloroform, methylene chloride, methyl chloride, etc., can be used to adjust the molecular weight.

As the ethylene-vinyl acetate copolymers, those having various contents of vinyl acetate and various saponification degrees are commercially available. Thus, from those ethylene-vinyl acetate copolymers, one satisfying the relationship of X×Y/100≧7.0 wherein X is a vinyl acetate content (% by mole) and Y is a saponification degree of a methyl ester(%) can be selected.

For example, EVAL 101, which is available from KURARAY Co., Ltd., has a vinyl acetate content of 68% and a saponification degree of 95%. Thus, X×Y/100 is 4.6. MELSEN H6051, which is available from TOSO CORPORATION, has a vinyl content of 11.2% and a saponification degree of 100%. Thus, X×Y/100 is 11.2. TECHNOLINK K200, which is available from TAOKA Chemical Co., Ltd., has a vinyl acetate content of 11.2% and a saponification degree of 85%. Thus, X×Y/100 is 9.52. They are all ethylene-vinyl acetate copolymers which can be used according to the present invention.

The melt flow rate (200° C., 5 kg-load) is from 0.5 to 100 g/10 minutes, preferably from 1.0 to 50 g/10 minutes.

The viscosity of the ethylene-vinyl acetate copolymer is preferably close to that of the tetrafluoroethylene copolymer. When the difference of the viscosities of the two copolymers is large, the thickness of either the layer of the tetrafluoroethylene copolymer or the layer of the ethylene-vinyl acetate copolymer may become uneven. Therefore, the melt flow rate of the ethylene-vinyl acetate copolymer is preferably in the above range.

As the polyolefin resin, preferably polyethylene, polystyrene, polypropylene, polybutene, ethylene-vinyl acetate copolymer (EVA), ethylene-methyl acetate copolymer, ethylene-ethyl acrylate copolymer, ethylene-ethyl acrylate-maleic anhydride copolymer, and the like are used. In particular, polyethylene is preferable.

To increase the adhesion strength between the ethylene-vinyl acetate copolymer layer (2) and the polyolefin resin layer (3), a known adhesive olefin (e.g. maleic anhydride-modified polyethylene, maleic anhydride-modified polypropylene, etc.), maleic anhydride-modified polystyrene, and the like may be used as an adhesive.

Each of the layers of the laminate according to the present invention may contain an additive which is suitable for each polymer such as a reinforcing agent, a filler, a stabilizer, a UV ray absorber, a pigment, etc. insofar as the characteristics of each layer are not deteriorated.

Such an additive can improve heat stability, surface hardness, abrasion resistance, antistatic properties, weather resistance, or other properties.

A method for producing the laminate of the present invention may be properly selected in accordance with the kind of the tetrafluoroethylene copolymer, the kinds of the materials used to form other layers, etc.

For example, the polymeric materials which form the respective layers are multilayer coextruded to form all the layers at one time to produce a molded article in the form of a film, a sheet, a tube, a hose, a bottle, a tank, etc.

EXAMPLES

Example 1

Pellets of a fluorine-containing polymer (monomer composition (molar ratio): TFE/Et/HFP/H2P ($CH_2$=$CF(CF_2)_3$H)=46.2/35.8/17.5/0.5; meltingpoint:158° C.; MFR: 20 g/10min. (230° C., 5 kg-load)) were charged in a mold having a diameter of 120 mm, and the mold is set in a press heated at 230° C., and the polymer was melt pressed under a pressure of about 50 kgf/cm$^2$ to obtain a sheet having a thickness of 0.5 mm.

Separately, each of an ethylene-vinyl alcohol copolymer (EVOH) (EVAL F101A available from KURARAY Co., Ltd.; vinyl acetate content X: 68% by mole; saponification degree: 95%; X×Y/100=64.6), maleic anhydride-modified polyethylene (ADOMER NF 528 available from MITSUI CHEMICALS, INC.) and high density polyethylene (BATEC-HD HJ560 available from Japan Polychem Corporation) was pressed at 230° C. in the same manner as above to obtain a sheet having a thickness of 0.5 mm.

Then, the four sheets obtained in the above steps were laminated in the order of the fluorine-containing polymer/ethylene-vinyl alcohol copolymer/maleic anhydride-modified polyethylene/high density polyethylene with inserting a polyimide film as a spacer partly between the fluorine-containing polymer sheet and the ethylene-vinyl alcohol copolymer sheet, and the laminate was placed in a mold having a diameter of 120 mm. The mold was set in a press heated at 230° C. and the laminate was pressed for 10 seconds under a pressure of 10 kgf/cm$^2$ to fusion bond the sheets.

The polyimide film spacer was removed, and the unbonded parts were provided as grasping parts in an adhesion strength test. Then, a maximum peel strength (initial) and a fuel-resistant strength were measured by a T-shape peeling test method with a Tensilon general tester (manufactured by ORIENTEC Co., Ltd.).

As a fuel-resistant strength, a maximum peel strength was used, which was measured after dipping the sample in a fuel (CM15: a mixture of isoocatane and toluene in a volume ratio of 50:50 containing 15% by volume of methanol) at 60° C. for 168 hours.

The results are shown in Table 1.

Examples 2–3 and Comparative Examples 1–4

A sheet was produced in the same manner as in Example 1 except that the layer structure was changed and the materials of each layer were selected as described below. The results are shown in Table 1.

Example 2

Layer structure: TFE copolymer layer/ethylene-vinyl acetate copolymer layer/polyolefin layer
TFE copolymer: the same as Example 1
Ethylene-vinyl acetate copolymer: EVOH (MELSEN H6051, available from TOSO CORPORATION; acetate content X: 11.2%; saponification degree: 100%; X×Y/100: 11.2)
Polyolefin: low density polyethylene (PETROCENE 292 available from TOSO CORPORATION)

Comparative Example 1

Layer structure: TFE copolymer layer/epoxy group-containing polyethylene layer/polyolefin layer
TFE copolymer: the same as Example 1
Eepoxy group-containing polyethylene: epoxy-modified polyethylene (LEX PERL RA3150 available from Nippon Polyolefins Co., Ltd.)
Polyolefin: polyethylene (UBE POLYETHYLENE L519 available from Ube Industries, Ltd.)

Example 3

Layer structure: the same as Example 1
The same as those used in Example 1 except that EVOH (TECHNOLINK K200 available from TAOKA Chemical Co., Ltd.; vinyl acetate content: 11.2%; saponification degree: 85%; X×Y/100: 9.52) being used as an ethylene-vinyl acetate copolymer layer.

Comparative Example 2

Layer structure: the same as Example 1
The same as those used in Example 1 except that EVOH (MELSEN 6410M available from TOSO CORPORATION; vinyl acetate content: 1.2%; saponification degree: 40%; X×Y/100: 4.48) being used as an ethylene-vinyl acetate copolymer layer.

Comparative Example 3

Layer structure: the same as Example 1
The same as those used in Example 1 except that EVA (ULTRACENE 540 available from TOSO CORPORATION; vinyl acetate content: 3.5%; saponification degree: 0%; X×Y/100: 0) being used as an ethylene-vinyl acetate copolymer layer.

Comparative Example 4

Layer structure: the same as Example 1
As a TFE copolymer, one prepared as follows was used:
The powder of the fluorine-containing polymer used in Example 1 (190 kg) and pure water (200 liters) were charged in a stainless steel tank. To the mixture, 28% aqueous ammonia was added and then the mixture was stirred at 80° C. for 5 hours while stirring. The powdery material was recovered from the tank, washed with water and dried to obtain a powdery polymer.

TABLE 1

| | TFE copolymer | Adhesive layer (Et-vinyl acetate copolymer layer) | Maximum adhesive strength (initial) (kg/cm) | Adhesive strength after dipping in fuel (kg/cm) | Dissolving test of adhesive layer in fuel |
|---|---|---|---|---|---|
| Ex. 1 | (Ex. 1) | EVOH X x Y/100 = 64.6 | Resin breakage >7.38 | 2.30 | No dissolving |
| Ex. 2 | (Ex. 1) | EVOH X x Y/100 = 11.2 | 2.82 | 1.78 | No dissolving |
| Comp. Ex. 1 | (Ex. 1) | (Epoxy-modified poly-ethylene) | Resin breakage >4.06 | X Spontaneously peeled due to dissolving of adhesive layer | Dissolved |
| Ex. 3 | (Ex. 1) | EVOH X x Y/100 = 9.52 | 2.64 | X Spontaneously peeled due to dissolving of adhesive layer | Dissolved |
| Comp. Ex. 2 | (Ex. 1) | EVOH X x Y/100 = 4.48 | X Spontaneously peeled | | Dissolved |
| Comp. Ex. 3 | (Ex. 1) | EVA X x Y/100 = 0 | X Spontaneously peeled | | Dissolved |
| Comp. Ex. 4 | (Ex. 1) (amide terminal) | EVOH X x Y/100 = 64.6 | X Spontaneously peeled | | No dissolving |

What is claimed is:

1. A laminate comprising
   a first layer of a tetrafluoroethylene copolymer comprising 30 to 81% by mole of tetrafluoroethylene and 70 to 19% by mole of at least one other monomer and having a carbonate group in a polymer chain or at a polymer chain terminal, which has a melt flow rate of 0.1 to 100 g/10 minutes (230° C., 5 kg-load) and a melting point of 90 to 230° C.,
   a second layer of an ethylene-vinyl acetate copolymer formed on one surface of the first layer which satisfies the following relationship:

$X \times Y/100 \geq 7.0$ wherein X is a vinyl acetate content (% by mole) and Y is a saponification degree of a methyl ester (%), and a third layer of a polyolefin resin formed on the second layer.

2. The laminate according to claim 1, wherein said tetrafluoroethylene copolymer of the layer (1) has a melt flow rate of 0.1 to 100 g/10 minutes (200° C., 5 kg-load) and a melting point of 90 to 200° C. is preferably used.

3. The laminate according to claim 1, wherein said tetrafluoroethylene copolymer comprises 40 to 81% by mole of tetrafluoroethylene and 60 to 19% by mole of other monomer.

4. The laminate according to claim 1, wherein said tetrafluoroethylene copolymer has a melt flow rate of 1.0 to 100 g/10 minutes.

5. The laminate according to claim 1, wherein said tetrafluoroethylene copolymer has a melt flow rate of 1.0 to 50 g/10 minutes.

6. The laminate according to claim 1, wherein said tetrafluoroethylene copolymer has a critical shear rate of 10 to $10^3$ sec$^{-1}$ at 230° C.

7. The laminate according to claim 1, wherein said tetrafluoroethylene copolymer comprises tetrafluoroethylene, ethylene, a fluorovinyl compound of the formula (I):

$$CH_2=CFRf \qquad (I)$$

wherein Rf is a fluoroalkyl group having 2 to 10 carbon atoms, and hexafluoropropylene, in which a molar ratio of tetrafluoroethylene to ethylene is from 40:60 to 90:10, the content of said fluorovinyl compound is from 0 to 10% by mole (based on the whole copolymer) and the content of hexane is from 0 to 30% by mole (based on the whole copolymer).

8. The laminate according to claim 1, wherein said ethylene-vinyl acetate copolymer has a vinyl acetate content X (% by mole) and a saponification degree Y (%) of a methyl ester satisfy the following relationship:

$$X \times Y/100 \geq 10.0.$$

9. The laminate according to claim 1, wherein said ethylene-vinyl acetate copolymer has a melt flow rate (200° C., 5 kg-load) of 0.5 to 100 g/10 minutes.

10. A tubular member comprising a laminate according to claim 1.

11. The tubular member according to claim 10, which is a tube for fuels.

12. A container comprising a laminate according to claim 1.

13. The container according to claim 12, which is a fuel tank.

14. A film comprising a laminate according to claim 1.

15. A sheet comprising a laminate according to claim 1.

* * * * *